March 11, 1952     R. R. ROSENBERG     2,588,768
FISH STRINGER
Filed Nov. 25, 1947
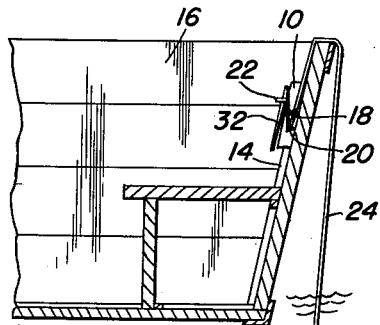
Fig. 1.
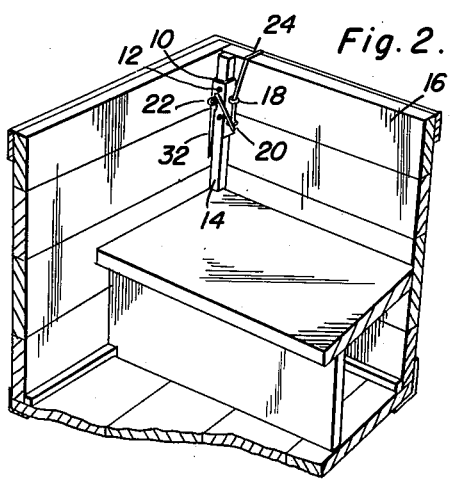
Fig. 2.
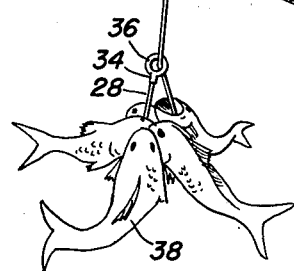
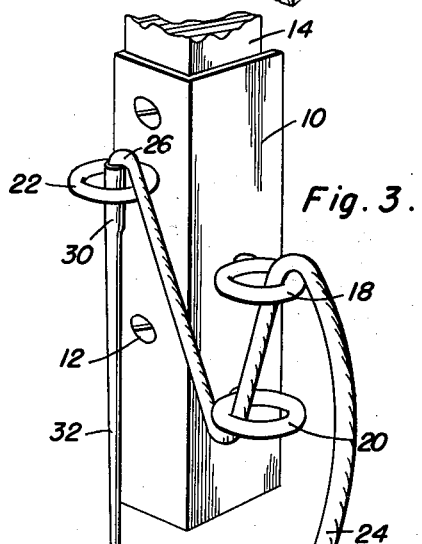
Fig. 3.
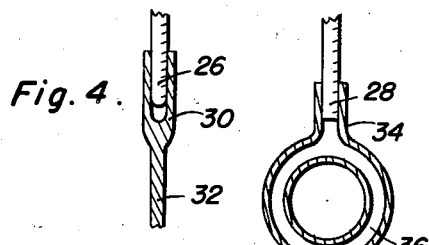
Fig. 4.    Fig. 5.
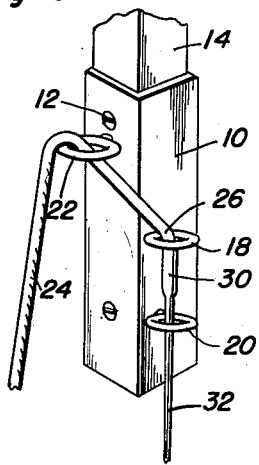
Fig. 6.
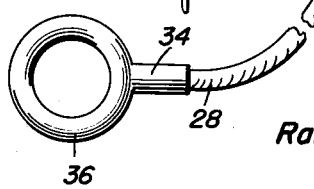
Ralph R. Rosenberg
INVENTOR.
BY *Clarence A. O'Brien*
*and Harvey B. Jacobson*
Attorneys Patented Mar. 11, 1952

2,588,768

UNITED STATES PATENT OFFICE 2,588,768

FISH STRINGER

Ralph R. Rosenberg, Fergus Falls, Minn.

Application November 25, 1947, Serial No. 788,027

2 Claims. (Cl. 224—7)

This invention relates to new and useful improvements in fish stringers and the primary object of the present invention is to provide novel and improved means for retaining a fish stringing device in a fixed position relative to a boat in such a manner that the same may be quickly and readily removed in a convenient manner for use.

Another important object of the present invention is to provide a fish stringing device including a line, a fish penetrating needle and novel and improved means for fixing said needle relative to the line.

A further object of the present invention is to provide a fish stringing device that is extremely small and compact in structure.

A still further aim of the present invention is to provide a fish stringing device that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary vertical sectional view of a boat showing the present invention in use applied thereto;

Figure 2 is a fragmentary perspective view of a boat and showing the present invention applied thereto;

Figure 3 is a fragmentary perspective view of a side support of a boat, and showing the present fish stringing device secured thereto;

Figure 4 is a fragmentary longitudinal sectional view of one end of the line and needle carried thereby;

Figure 5 is a fragmentary longitudinal sectional view of the movable end of the line and retaining ring carried thereby; and, Figure 6 is a similar view of Figure 5 and showing an alternate method for applying the supporting line to the base member.

Referring now to the drawings in detail, wherein for the purpose of illustration, there is disclosed a preferred embodiment of the present invention, the numeral 10 represents a preferably angle iron base member that is fixedly secured by fasteners or the like 12 to the side support 14 of a boat 16.

Rigidly secured to one leg of the base member 10, is a pair of substantially horizontally disposed vertically spaced eye members 18 and 20 that are disposed in spaced parallel planes relative to an upper eye member 22 that is rigidly secured to the other leg of said base member.

The numeral 24 represents a flexible line of cord or the like having end portions 26 and 28. Fixedly secured to one end portion of the line, for example end portion 26, is the sleeve portion 30 of an integral fish penetrating needle 32, and fixed to the other end portion 28, is the integral sleeve 34 projecting outwardly from a hollow retaining ring 36.

In practical use of the device, the needle 32 is extended through one or more fish 38 which are slid along the line until stopped by the retaining ring 36. The needle 32 is then slipped through the ring 36 so that the fish will be fixed on the line as shown in Figure 1. The needle 32 is then slipped downwardly through the eye members 18 and 20, inclined upwardly, and extended downwardly through the eye member 22 so that the line 24 will be snubbed relative to the eye members as shown in Figure 3.

Obviously, as shown in Figure 6, the needle 32 may be extended upwardly through eye member 22, then downwardly through eye members 18 and 20 to be snubbed relative to the eye members without movement.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A snubbing device for fish stringing cords comprising a vertical angle iron anchor member having a pair of relatively perpendicular side portions, a plurality of horizontal eye members projecting outwardly from one of said side portions adapted to receive a fish stringing cord, and a further horizontal eye member projecting outwardly from the remaining of said side portions and disposed above the plurality of eye members and adapted to receive one end of a fish stringing cord extended through said plurality of eye members.

2. A rope fastener comprising a vertically disposed angle iron member including first and second relatively perpendicular side portions, said first side portion having a plurality of apertures therein adapted to receive fasteners whereby the member may be detachably secured to a supporting structural element, a plurality of horizontally disposed eye members projecting outwardly from the second side portion of said member adapted to receive a rope therein, and a further horizontal eye member projecting outwardly from the first side portion of said member and disposed in a horizontal plane above the uppermost of said plurality of eye members and adapted to receive a rope extended through said plurality of eye members.

RALPH R. ROSENBERG.

REFERENCES CITED

The following references are of record in the file of this patent:

UNITED STATES PATENTS

| Number | Name | Date |
| --- | --- | --- |
| 518,880 | Evans | Apr. 24, 1894 |
| 849,410 | Mills | Apr. 9, 1907 |
| 1,000,756 | Roberts | Aug. 15, 1911 |
| 1,251,048 | Kesterson | Dec. 25, 1917 |
| 1,608,953 | Pflueger | Nov. 30, 1926 |
| 2,437,331 | Murray et al. | Mar. 9, 1948 |
| 2,453,381 | Orton | Nov. 9, 1948 |
| 2,469,443 | Reiter | May 10, 1949 |
| 2,518,915 | Loree | Aug. 15, 1950 |